(12) United States Patent
Banks et al.

(10) Patent No.: US 11,215,061 B2
(45) Date of Patent: Jan. 4, 2022

(54) BLADE WITH WEARABLE TIP-RUB-PORTIONS ABOVE SQUEALER POCKET

(71) Applicant: United Technologies Corporation, Farmington, CT (US)

(72) Inventors: Anton G. Banks, Manchester, CT (US); Lane Mikal Thornton, Tolland, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/781,729

(22) Filed: Feb. 4, 2020

(65) Prior Publication Data

US 2021/0239009 A1 Aug. 5, 2021

(51) Int. Cl.
*F01D 5/20* (2006.01)

(52) U.S. Cl.
CPC ............ *F01D 5/20* (2013.01); *F05D 2220/32* (2013.01); *F05D 2240/307* (2013.01)

(58) Field of Classification Search
CPC ..... F01D 5/20; F01D 11/122; F05D 2240/307
See application file for complete search history.

(56) References Cited

U.S. PATENT DOCUMENTS

| | | | | |
|---|---|---|---|---|
| 3,885,886 A | * | 5/1975 | Richter | F01D 5/187 415/116 |
| 4,411,597 A | * | 10/1983 | Koffel | B23P 6/005 416/92 |
| 4,480,956 A | * | 11/1984 | Kruger | F01D 5/14 416/97 A |
| 4,589,823 A | * | 5/1986 | Koffel | F01D 5/20 415/173.4 |
| 5,752,802 A | * | 5/1998 | Jones | F01D 5/20 415/170.1 |
| 5,902,093 A | | 5/1999 | Liotta et al. | |
| 6,135,715 A | * | 10/2000 | Correia | F01D 5/20 416/97 R |
| 9,663,404 B2 | * | 5/2017 | de Diego | C04B 35/14 |
| 10,801,334 B2 | * | 10/2020 | Mongillo | F01D 5/005 |

(Continued)

FOREIGN PATENT DOCUMENTS

| | | | | |
|---|---|---|---|---|
| DE | 102017209421 A1 | * | 12/2018 | ............... F01D 5/20 |
| EP | 3428397 A1 | | 1/2019 | |

(Continued)

OTHER PUBLICATIONS

European Search Report Issued in European Application No. 21155078.5-1004 dated May 25, 2021; 9 Pages.

*Primary Examiner* — Topaz L. Elliott
(74) *Attorney, Agent, or Firm* — Cantor Colburn LLP

(57) ABSTRACT

Disclosed is a blade, having: a blade root; a blade body that extends radially from the blade root to a blade tip, the blade body having a pressure side and a suction side each extending from a leading edge of the blade body to a trailing edge of the blade body; a squealer pocket located in the blade tip; and a first wearable tip-rub-portion located radially above the squealer pocket, and extending between the pressure side and the suction side, the first wearable tip-rub-portion terminating at a first wearable tip-rub-portion distal end.

14 Claims, 4 Drawing Sheets

(56) References Cited

U.S. PATENT DOCUMENTS

| | | | |
|---|---|---|---|
| 2011/0123350 A1* | 5/2011 | Pons | F01D 5/20 |
| | | | 416/241 R |
| 2013/0171426 A1* | 7/2013 | de Diego | C04B 35/5805 |
| | | | 428/182 |
| 2015/0159488 A1* | 6/2015 | Lehmann | F01D 5/18 |
| | | | 416/1 |
| 2015/0308276 A1* | 10/2015 | Kleinow | F01D 5/141 |
| | | | 416/228 |
| 2018/0142559 A1* | 5/2018 | Coomer | F01D 5/187 |
| 2019/0017391 A1 | 1/2019 | Dyson et al. | |
| 2020/0080427 A1* | 3/2020 | Mongillo | F01D 5/005 |
| 2020/0200020 A1* | 6/2020 | Wong | F01D 5/187 |

FOREIGN PATENT DOCUMENTS

| | | | | |
|---|---|---|---|---|
| KR | 20040068478 A | * | 7/2004 | F01D 5/147 |
| KR | 101875683 B1 | * | 7/2018 | F01D 5/20 |
| WO | WO-2014096839 A1 | * | 6/2014 | F01D 5/20 |
| WO | 2016118135 A1 | | 7/2016 | |
| WO | WO-2019177600 A1 | * | 9/2019 | F01D 5/186 |

* cited by examiner

BLADE WITH WEARABLE TIP-RUB-PORTIONS ABOVE SQUEALER POCKET

BACKGROUND

Embodiments of the present disclosure pertain to a blade for a gas turbine engine and more specifically to a blade having wearable tip-rub-portions located above a squealer pocket.

A turbine blade is responsible for extracting energy from the high temperature, high pressure gas produced by the combustor. A squealer pocket formed at a blade tip of the turbine blade may enhance aerodynamic and thermodynamic properties around the blade. The blade tip, including around the squealer pocket, may be subject to wear against a blade outer air seal segment (BOAS), e.g., that is radially adjacent to the blade tip, especially during a green (break-in) run, when the blade outer air seal segment may be out of round.

BRIEF DESCRIPTION

Disclosed is a blade for a gas turbine engine, including: a blade root; a blade body that extends radially from the blade root to a blade tip, the blade body having a pressure side and a suction side each extending from a leading edge of the blade body to a trailing edge of the blade body; a squealer pocket located in the blade tip; and a first wearable tip-rub-portion located radially above the squealer pocket, and extending between the pressure side and the suction side, the first wearable tip-rub-portion terminating at a first wearable tip-rub-portion distal end.

In addition to one or more of the above disclosed aspects of the blade, or as an alternate, a second wearable tip-rub-portion is located radially above the squealer pocket, and extending between the suction side and the pressure side; the second wearable tip-rub-portion terminating at a second wearable tip-rub-portion distal end, wherein the first and second wearable tip-rub-portion distal ends are spaced from each other to define a wearable tip-rub-portion opening that is in fluid communication with the squealer pocket; and the first and second wearable tip-rub-portions are continuous with each other about leading and trailing edges of the blade body.

In addition to one or more of the above disclosed aspects of the blade, or as an alternate, the blade, further includes: a core passage defined within the blade body and extending from the blade root to the blade tip; a first metering tip-portion located radially between the squealer pocket and the core passage, and extending between the pressure side and the suction side, the first metering tip-portion terminating at a first metering tip-portion distal end; and a second metering tip-portion located radially between the squealer pocket and the core passage, and extending between the suction side and the pressure side, the second metering tip-portion terminating at a second metering tip-portion distal end, wherein the first and second metering tip-portion distal ends are spaced from each other to define a metering tip-portion opening that is in fluid communication with the squealer pocket, so that the core passage is in fluid communication with the wearable tip-rub-portion opening.

In addition to one or more of the above disclosed aspects of the blade, or as an alternate, the first and second metering tip-portions are continuous with each other about the leading and trailing edges of the blade body, and wherein the first and second wearable tip-rub-portions and the first and second metering tip-portions have a same shape.

In addition to one or more of the above disclosed aspects of the blade, or as an alternate, the first and second wearable tip-rub-portions have a first radial thickness in the and the first and second metering tip-portions have a second radial thickness that is greater than the first radial thickness.

In addition to one or more of the above disclosed aspects of the blade, or as an alternate, the squealer pocket has a first radial height that is greater than the second radial thickness.

In addition to one or more of the above disclosed aspects of the blade, or as an alternate, the wearable tip-rub-portion opening has a first axial span and the metering tip-portion opening has a second axial span that is the same as the first axial span.

In addition to one or more of the above disclosed aspects of the blade, or as an alternate, the squealer pocket has a third axial span that is greater than the first axial span.

In addition to one or more of the above disclosed aspects of the blade, or as an alternate, the blade is a turbine blade.

Further disclosed is a gas turbine engine, including: a blade that includes: a blade root; a blade body that extends radially from the blade root to a blade tip, the blade body having a pressure side and a suction side each extending from a leading edge of the blade body to a trailing edge of the blade body; a squealer pocket located in the blade tip; and a first wearable tip-rub-portion located radially above the squealer pocket, and extending between the pressure side and the suction side, the first wearable tip-rub-portion terminating at a first wearable tip-rub-portion distal end.

In addition to one or more of the above disclosed aspects of the gas turbine engine, or as an alternate, a second wearable tip-rub-portion is located radially above the squealer pocket, and extending between the suction side and the pressure side; the second wearable tip-rub-portion terminating at a second wearable tip-rub-portion distal end, wherein the first and second wearable tip-rub-portion distal ends are spaced from each other to define a wearable tip-rub-portion opening that is in fluid communication with the squealer pocket; and the first and second wearable tip-rub-portions are continuous with each other about leading and trailing edges of the blade body.

In addition to one or more of the above disclosed aspects of the gas turbine engine, or as an alternate, a core passage is defined within the blade body and extending from the blade root to the blade tip; a first metering tip-portion located radially between the squealer pocket and the core passage, and extending between the pressure side and the suction side, the first metering tip-portion terminating at a first metering tip-portion distal end; and a second metering tip-portion located radially between the squealer pocket and the core passage, and extending between the suction side and the pressure side, the second metering tip-portion terminating at a second metering tip-portion distal end, wherein the first and second metering tip-portion distal ends are spaced from each other to define a metering tip-portion opening that is in fluid communication with the squealer pocket, so that the core passage is in fluid communication with the wearable tip-rub-portion opening.

In addition to one or more of the above disclosed aspects of the gas turbine engine, or as an alternate, the first and second metering tip-portions are continuous with each other about the leading and trailing edges of the blade body, and wherein the first and second wearable tip-rub-portions and the first and second metering tip-portions have a same shape.

In addition to one or more of the above disclosed aspects of the gas turbine engine, or as an alternate, the first and second wearable tip-rub-portions have a first radial thickness and the first and second metering tip-portions have a second radial thickness that is greater than the first radial thickness.

In addition to one or more of the above disclosed aspects of the gas turbine engine, or as an alternate, the squealer pocket has a first radial height that is greater than the second radial thickness.

In addition to one or more of the above disclosed aspects of the gas turbine engine, or as an alternate, the wearable tip-rub-portion opening has a first axial span and the metering tip-portion opening has a second axial span that is the same as the first axial span.

In addition to one or more of the above disclosed aspects of the gas turbine engine, or as an alternate, the squealer pocket has a third axial span that is greater than the first axial span.

In addition to one or more of the above disclosed aspects of the gas turbine engine, or as an alternate, the gas turbine engine further includes a turbine section, wherein the blade is turbine blade operationally connected to the turbine section.

Further disclosed is a method of shaping a blade outer air seal of a gas turbine engine, including: driving a blade about an engine center axis; and rubbing, from the driving, a first wearable tip-rub-portion of the blade that is located radially above a squealer pocket against the blade outer air seal to shape the blade outer air seal.

In addition to one or more of the above disclosed aspects of the method, or as an alternate, the method further includes rubbing away, from the driving, the first wearable tip-rub-portion to expose the squealer pocket.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the FIGS.

Figure 1:
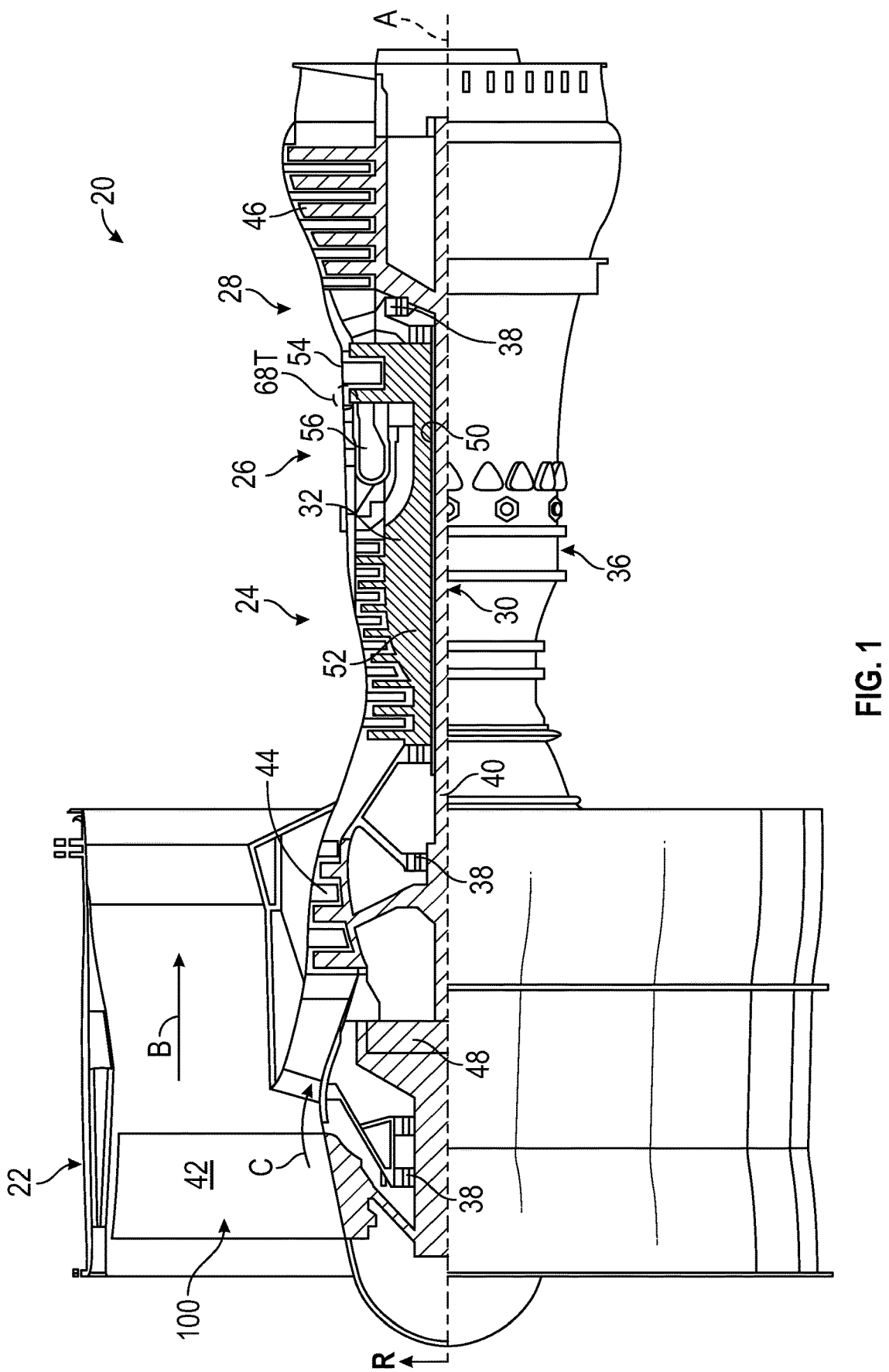
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A (engine radial axis R is also illustrated in FIG. 1) relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft. (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram~°~R)/(518.7°~R)]^{0.5}$. The "Low corrected fan tip speed" as disclosed herein according to one non-limiting embodiment is less than about 1150 ft/second (350.5 m/sec).

Figure 2:
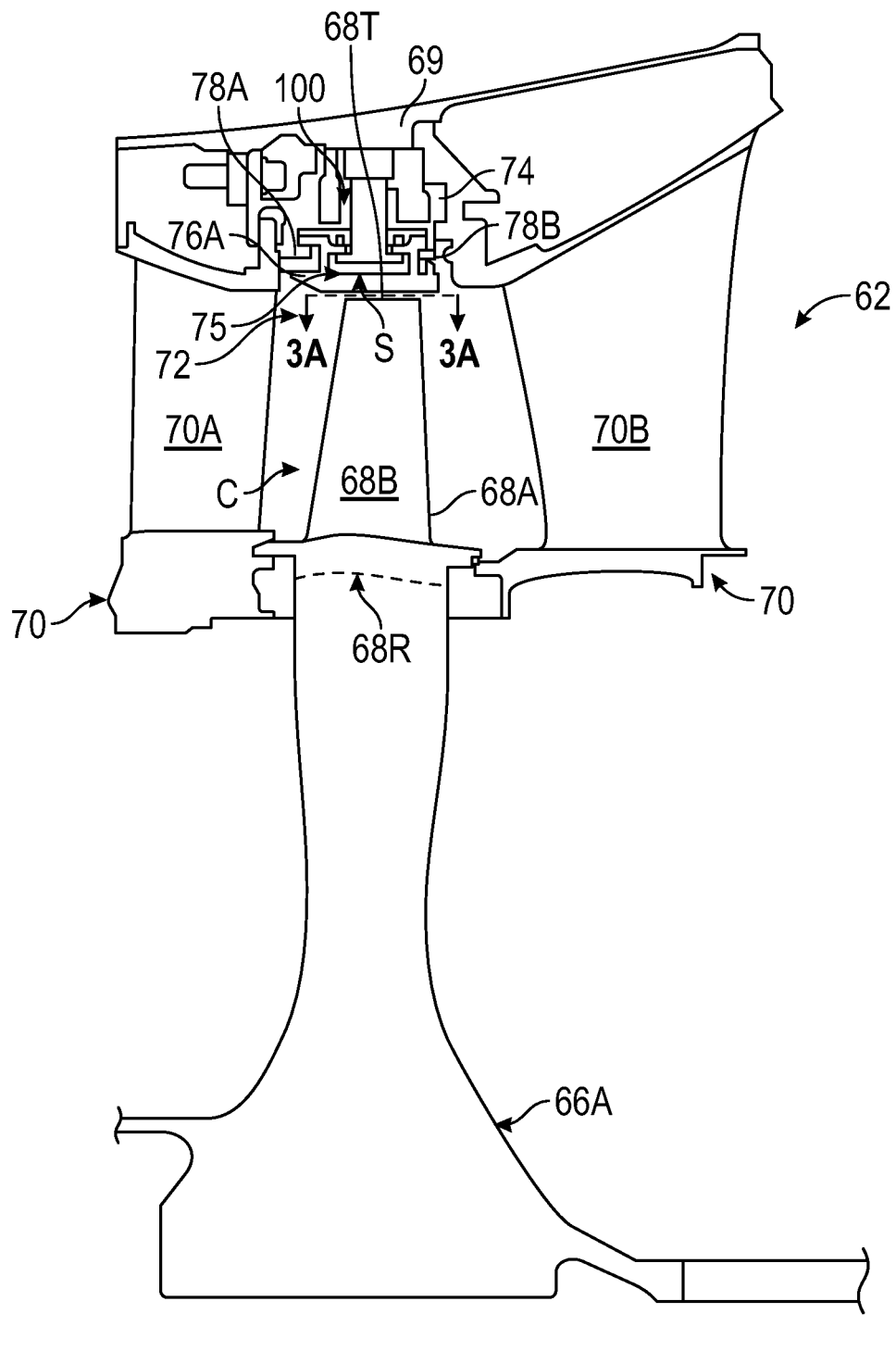
FIG. 2 is a partial cross-sectional view of a blade assembly of the gas turbine engine.

FIG. 2 illustrates a portion 62 of a gas turbine engine, such as the gas turbine engine 20 of FIG. 1. In this exemplary embodiment, the portion 62 represents a single stage high pressure turbine ('high pressure turbine') 54. However, it should be understood that other portions of the gas turbine engine 20 could benefit from the teachings of this disclosure, including but not limited to, the compressor section 24, any additional stage(s) of the high pressure turbine, and the low pressure turbine 46.

In this exemplary embodiment, a rotor disk 66 (one rotor disk 66A is shown, although multiple disks could be axially disposed within the portion 62) is mounted to the outer shaft 50 and rotates as a unit with respect to the engine static structure 36. The portion 62 includes alternating rows of rotating blades 68 (one blade 68A is shown) is mounted to the rotor disk 66 by a blade root 68R (illustrated schematically). Vanes 70A and 70B of vane assemblies 70 are also supported within an outer casing 69 of the engine static structure 36.

The blade 68A includes a blade tip 68T that is positioned at a radially outermost portion of the blade 68A, a blade root 68R at the radially innermost portion of the blade 68A and a blade body 68B extending therebetween. The blade tip 68T extends toward a blade outer air seal (BOAS) assembly 72. The blade outer air seal assembly 72 may find beneficial use in many industries including aerospace, industrial, electricity generation, naval propulsion, pumps for gas and oil transmission, aircraft propulsion, vehicle engines and stationary power plants.

The blade outer air seal assembly 72 is disposed in an annulus radially between the outer casing 69 and the blade tip 68T. The blade outer air seal assembly 72 generally includes a support structure 74 and a multitude of blade outer air seal segments 76 (one blade outer air seal segments 76A is shown). The blade outer air seal segments 76 may form a full ring hoop assembly that encircles associated blades 68 of a stage of the portion 62. The support structure 74 is mounted radially inward from the outer casing 69 and includes forward and aft flanges 78A, 78B that mountably receive the blade outer air seal segments 76. The forward flange 78A and the aft flange 78B may be manufactured of a metallic alloy material and may be circumferentially segmented for the receipt of the blade outer air seal segments 76.

The support structure 74 may establish a cavity 75 that extends axially between the forward flange 78A and the aft flange 78B and radially between the outer casing 69 and the blade outer air seal segment 76A. A secondary cooling airflow S may be communicated into the cavity 75 to provide a dedicated source of cooling airflow for cooling the blade outer air seal segments 76. The secondary cooling airflow S can be sourced from the high pressure compressor 52 or any other upstream portion of the gas turbine engine 20. During typical operation, the secondary cooling airflow S provides a biasing force that biases the blade outer air seal segment 76A radially inward toward the axis A. In this example, the forward and aft flanges 78A, 78B are portions of the support structure 74 that limit radially inward movement of the blade outer air seal segment 76A due to the biasing force.

As indicated, the blade tip 68T may be subject to wear against the blade outer air seal segment 76A, especially during a green (break-in) run, when the blade outer air seal segment 76A may be out of round, e.g., relative to the axis A. The disclosed embodiments, shown in FIGS. 3A-3C (discussed in greater detail below) form a core passage 180A and a squealer pocket relatively deeply within the blade body 68B, thereby enabling the forming of wearable tip-rub-portions 210, 230 at the blade tip 68T. As the wearable tip-rub-portions 210, 230 wear away, the blade outer air seal segment 76A may be rounded as intended for post-green runs. Additionally, the wearable tip-rub-portions 210, 230, once worn away, may expose the core passages 180A and/or 180B.

Figure 3A:
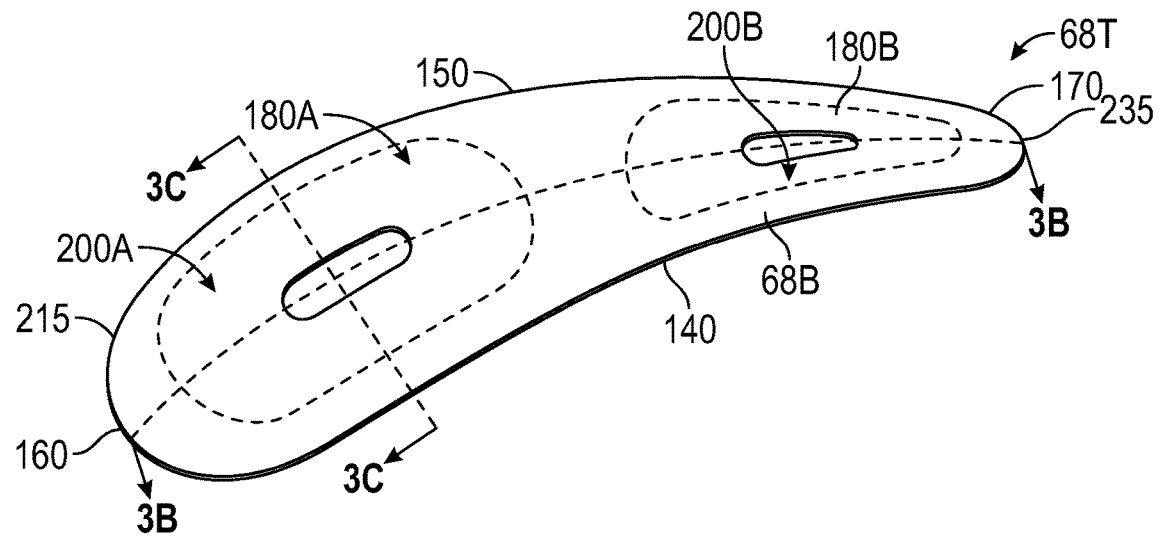
FIG. 3A is partial cross-sectional view of a blade of the gas turbine engine taken along section line 3A-3A in FIG. 2.
Figure 3B:
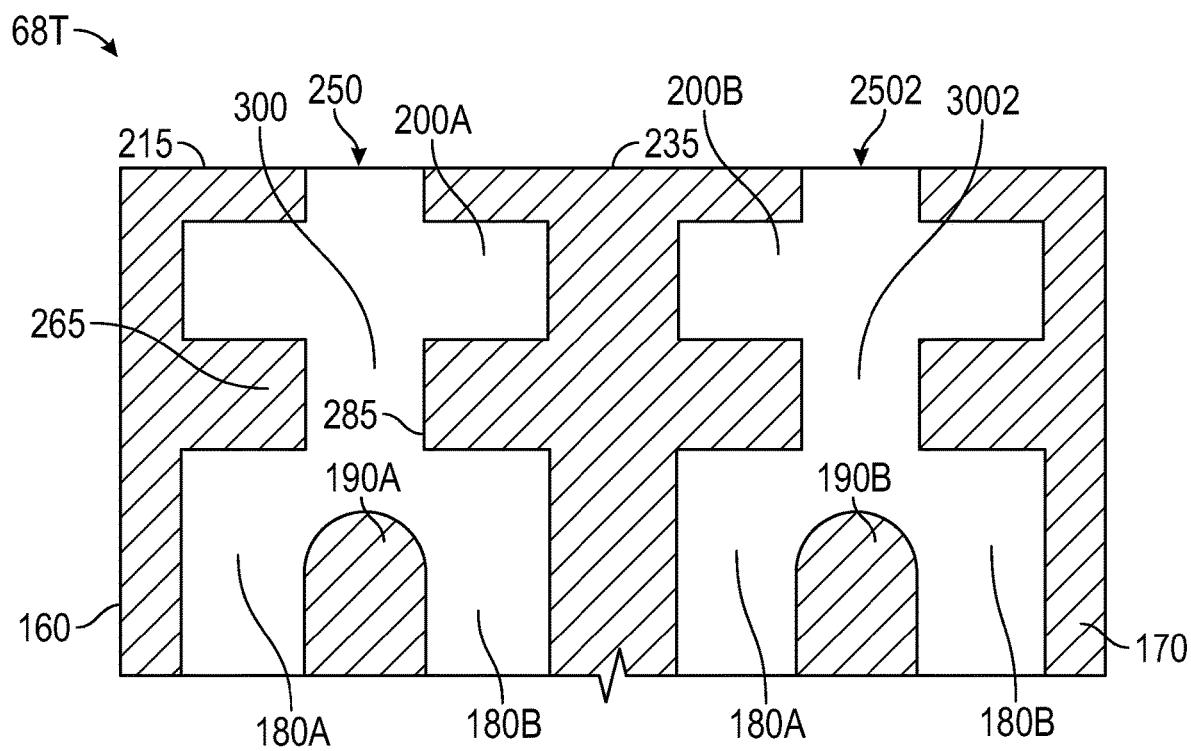
FIG. 3B is partial cross-sectional view of a blade of the gas turbine engine taken along section line 3B-3B in FIG. 3A.
Figure 3C:
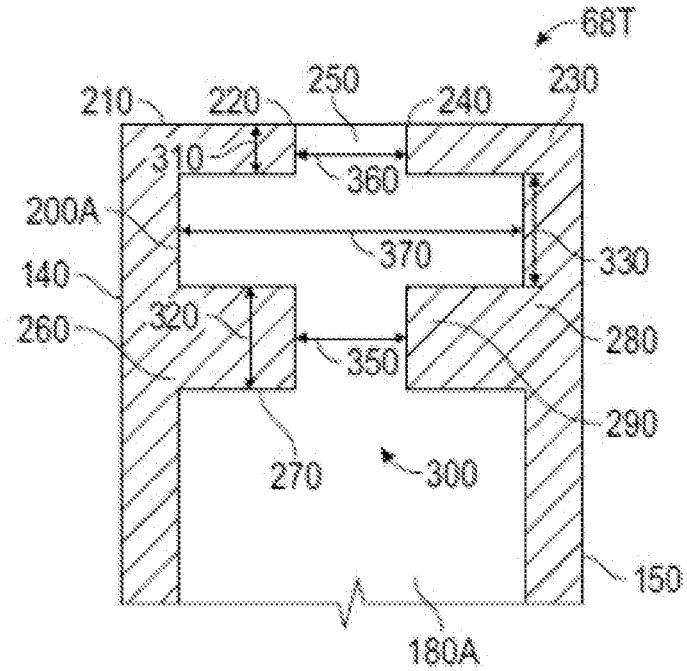
FIG. 3C is partial cross-sectional view of a blade of the gas turbine engine taken along section line 3C-3C in FIG. 3A.

Turning now to FIGS. 3A-3C, the blade body 68B has a pressure side 140 and a suction side 150. The pressure and suction sides 140, 150 each extend from a leading edge 160 of the blade body 68B to a trailing edge 170 of the blade body 68B. Core passages 180 (first and second core passages 180A, 180B are shown) may be defined within the blade body 68B. The core passages 180 may be configured the same as each other in the blade 68A. For simplicity, the first core passage 180A will be referred to as the core passage 180A. The core passage 180A may extend from the blade root 68R to the blade tip 68T. In an embodiment, ribs 190 (first and second ribs 190A, 190B are shown) may be respectively supported within the core passages 180, radially between the blade root 68R and the blade tip 68T.

Squealer pockets 200 (first and second squealer pockets 200A, 200B are shown) are located in the blade tip 68T, respectively above the core passages 180. The squealer pockets 200A and 200B may be configured the same as each other in the blade 68A. For simplicity, the first squealer pocket 200A will be referred to as the squealer pocket 200A. Located radially above the squealer pocket 200A is a first wearable tip-rub-portion 210. The first wearable tip-rub-portion 210 extends between the pressure side 140 and the suction side 150 (FIG. 3C). The first wearable tip-rub-portion 210 terminates at a first wearable tip-rub-portion distal end 220. A second wearable tip-rub-portion 230 is also located radially above the squealer pocket 200A. The second wearable tip-rub-portion 230 extends between the suction side 150 and the pressure side 140 (FIG. 3C). The second wearable tip-rub-portion 230 terminates at a second wearable tip-rub-portion distal end 240. The first and second wearable tip-rub-portion distal ends 220, 240 are spaced from each other to define a wearable tip-rub-portion opening 250. The wearable tip-rub-portion opening 250 is in fluid communication with the squealer pocket 200A. The first and second wearable tip-rub-portions 210, 230 may be continuous with each other about the leading and trailing edges 160, 170 of the blade body 68B. For example, a third wearable tip-rub-portion 215 may extend between the leading edge 160 and the trailing edge 170 (FIG.3B) and a fourth wearable tip-rub-portion 235 may extend between the trailing edge 170 and the leading edge 160 (FIG. 3B). FIG. 3B shows a second wearable tip-rub-portion opening 2502, that is the same as the wearable tip-rub-portion opening 250, formed above the second squealer pocket 200B.

A first metering tip-portion 260 is located radially between the squealer pocket 200A and the core passage 180A. The first metering tip-portion 260 extends between the pressure side 140 and the suction side 150 (FIG. 3C). The first metering tip-portion 260 terminates at a first metering tip-portion distal end 270 (FIG. 3C). A second metering tip-portion 280 is also located radially between the squealer pocket 200A and the core passage 180A. The second metering tip-portion 280 extends between the suction side 150 and the pressure side 140 (FIG. 3C). The second metering tip-portion 280 terminates at a second metering tip-portion distal end 290 (FIG. 3C). The first and second metering tip-portion distal ends 270, 290 are spaced from each other to define a metering tip-portion opening 300 that is in fluid communication with the squealer pocket 200A. From this configuration, the core passage 180A is in fluid communication with the wearable tip-rub-portion opening 250. The first and second metering tip-portions 260, 280 may be continuous with each other about the leading and trailing edges 160, 170 of the blade body 68B. For example, a third metering tip-portion 265 may extend between the leading edge 160 and the trailing edge 170 (FIG. 3B) and a fourth metering tip-portion 285 may extend between the trailing edge 170 and the leading edge 160 (FIG. 3B). FIG. 3B shows a second metering tip-portion opening 3002, that is the same as the metering tip-portion opening 300, formed between the second squealer pocket 200B and the second core passage 180B. In addition, the first and second wearable tip-rub-portions 210, 230 and the first and second metering tip-portions 260, 280 may have the same shape, e.g., in a top-down view, along the engine radial axis R (FIG. 1).

As illustrated in FIG. 3C, in an embodiment, the first and second wearable tip-rub-portions 210, 230 have a first radial thickness 310. The first and second metering tip-portions 260, 280 have a second radial thickness 320 that is greater than the first radial thickness 310. In an embodiment, the squealer pocket 200A has a first radial height 330 that is greater than the second radial thickness 320. For example, the first radial height 330 may be sized so that, when the first and second wearable tip-rub-portions 210, 230 have warn away, at least half of the first radial height 330 remains. In an embodiment, the wearable tip-rub-portion opening 250 has a first axial span 340 and the metering tip-portion opening 300 has a second axial span 350 that is the same as the first axial span 340. In an embodiment, the squealer pocket 200A has a third axial span 370 that is greater than the first axial span 340.

Figure 4:
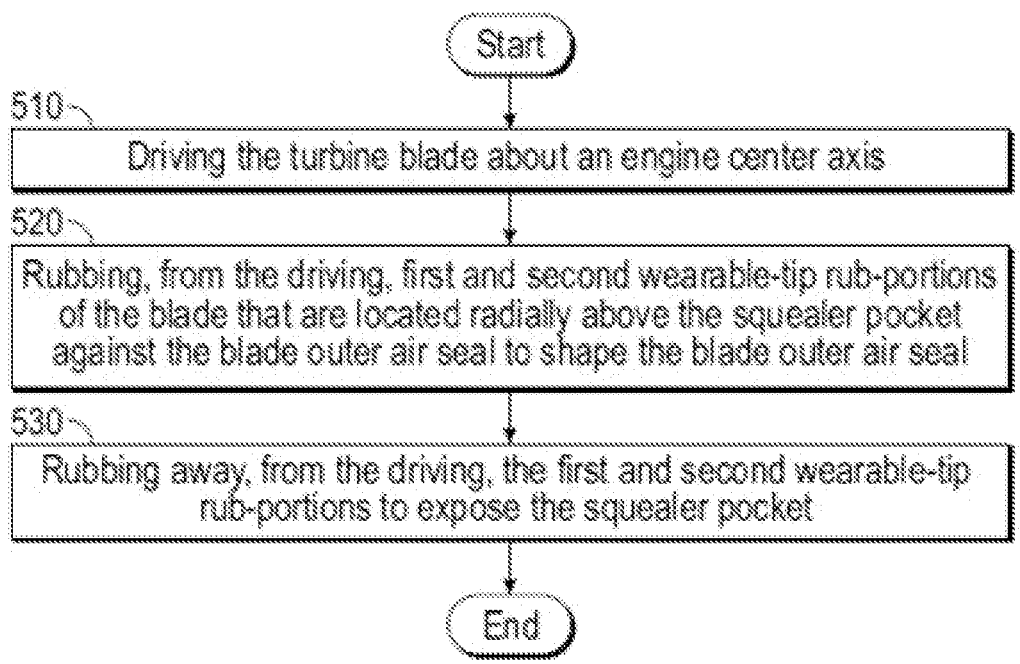
FIG. 4 is a flowchart showing a method of shaping a blade outer air seal segment according to an embodiment.

FIG. 4 is a flowchart showing a method of shaping the blade outer air seal segment 76A of the gas turbine engine 20. As shown in block 510, the method includes driving the blade 68A about the engine center axis A (FIG. 1). As shown in block 520, the method includes rubbing, from the driving (at block 510), the first (and second) wearable tip-rub-portion 210 and (230), of the blade 68A that are located radially above the squealer pocket 200A against the blade outer air seal segment 76A to shape the blade outer air seal segment 76A. In addition, as shown in block 530, the method includes rubbing away, from the driving (at block 510), the first (and second) wearable tip-rub-portion 210 (and 230) to expose the squealer pocket 200A.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:
1. A blade for a gas turbine engine, comprising:
   a blade root;
   a blade body that extends radially from the blade root to a blade tip, the blade body having a pressure side and a suction side each extending from a leading edge of the blade body to a trailing edge of the blade body;
   a squealer pocket located in the blade tip;
      a first wearable tip-rub-portion located radially at the blade tip, radially above the squealer pocket, and extending between the pressure side and the suction side, the first wearable tip-rub-portion terminating at a first wearable tip-rub-portion distal end that is located radially at the blade tip;
      a second wearable tip-rub-portion located radially at the blade tip, radially above the squealer pocket, and extending between the suction side and the pressure side, the second wearable tip-rub-portion terminating at a second wearable tip-rub-portion distal end that is located radially at the blade tip,
   wherein:
      the first and second wearable tip-rub-portion distal ends are spaced from each other to define a wearable tip-rub-portion opening that is located radially at the blade tip and in fluid communication with the squealer pocket; and
      the first and second wearable tip-rub-portions are continuous with each other about the leading and trailing edges of the blade body;
   a core passage defined within the blade body;
      a first metering tip-portion located radially between the squealer pocket and the core passage, and extending between the pressure side and the suction side, the first metering tip-portion terminating at a first metering tip-portion distal end; and
      a second metering tip-portion located radially between the squealer pocket and the core passage, and extending between the suction side and the pressure side, the second metering tip-portion terminating at a second metering tip-portion distal end, wherein the first and second metering tip-portion distal ends are spaced from each other to define a metering tip-portion opening that is in fluid communication with the squealer pocket, so that the core passage is in fluid communication with the wearable tip-rub-portion opening; and wherein:

the first and second metering tip-portions are continuous with each other about the leading and trailing edges of the blade body, and the first and second wearable tip-rub-portions and the first and second metering tip-portions have a same shape, so that the tip-rub-portion opening and the metering tip-portion opening have a same shape.

2. The blade of claim 1, wherein
the first and second wearable tip-rub-portions have a first radial thickness and the first and second metering tip-portions have a second radial thickness that is greater than the first radial thickness.

3. The blade of claim 2, wherein
the squealer pocket has a first radial height that is greater than the second radial thickness.

4. The blade of claim 3, wherein
the wearable tip-rub-portion opening has a first axial span and the metering tip-portion opening has a second axial span that is the same as the first axial span.

5. The blade of claim 4, wherein
the squealer pocket has a third axial span that is greater than the first axial span.

6. The blade of claim 1, wherein
the blade is a turbine blade.

7. A gas turbine engine, comprising:
a blade that includes:
a blade root;
a blade body that extends radially from the blade root to a blade tip, the blade body having a pressure side and a suction side each extending from a leading edge of the blade body to a trailing edge of the blade body;
a squealer pocket located in the blade tip; and
  a first wearable tip-rub-portion located radially at the blade tip, radially above the squealer pocket, and extending between the pressure side and the suction side, the first wearable tip-rub-portion terminating at a first wearable tip-rub-portion distal end that is located radially at the blade tip;
  a second wearable tip-rub-portion located radially at the blade tip, radially above the squealer pocket, and extending between the suction side and the pressure side, the second wearable tip-rub-portion terminating at a second wearable tip-rub-portion distal end that is located radially at the blade tip,
wherein:
  the first and second wearable tip-rub-portion distal ends are spaced from each other to define a wearable tip-rub-portion opening that is located radially at the blade tip and in fluid communication with the squealer pocket; and
  the first and second wearable tip-rub-portions are continuous with each other about the leading and trailing edges of the blade body;
a core passage defined within the blade body;
  a first metering tip-portion located radially between the squealer pocket and the core passage, and extending between the pressure side and the suction side, the first metering tip-portion terminating at a first metering tip-portion distal end; and
  a second metering tip-portion located radially between the squealer pocket and the core passage, and extending between the suction side and the pressure side, the second metering tip-portion terminating at a second metering tip-portion distal end, wherein the first and second metering tip-portion distal ends are spaced from each other to define a metering tip-portion opening that is in fluid communication with the squealer pocket, so that the core passage is in fluid communications with the wearable tip-rub-portion opening; and wherein:

the first and second metering tip-portions are continuous with each other about the leading and trailing edges of the blade body, and the first and second wearable tip-rub-portions and the first and second metering tip-portions have a same shape, so that the tip-rub-portion opening and the metering tip-portion opening have a same shape.

8. The gas turbine engine of claim 7, wherein
the first and second wearable tip-rub-portions have a first radial thickness and the first and second metering tip-portions have a second radial thickness that is greater than the first radial thickness.

9. The gas turbine engine of claim 8, wherein
the squealer pocket has a first radial height that is greater than the second radial thickness.

10. The gas turbine engine of claim 9, wherein
the wearable tip-rub-portion opening has a first axial span and the metering tip-portion opening has a second axial span that is the same as the first axial span.

11. The gas turbine engine of claim 10, wherein
the squealer pocket has a third axial span that is greater than the first axial span.

12. The gas turbine engine of claim 7, further comprising
a turbine section, wherein the blade is turbine blade operationally connected to the turbine section.

13. A method of shaping a blade outer air seal of a gas turbine engine which includes a blade,
wherein the blade includes:
a blade root;
a blade body that extends radially from the blade root to a blade tip, the blade body having a pressure side and a suction side each extending from a leading edge of the blade body to a trailing edge of the blade body;
a squealer pocket located in the blade tip;
  a first wearable tip-rub-portion located radially at the blade tip, radially above the squealer pocket, and extending between the pressure side and the suction side, the first wearable tip-rub-portion terminating at a first wearable tip-rub-portion distal end that is located radially at the blade tip;
  a second wearable tip-rub-portion located radially at the blade tip, radially above the squealer pocket, and extending between the suction side and the pressure side, the second wearable tip-rub-portion terminating at a second wearable tip-rub-portion distal end that is located radially at the blade tip,
wherein:
  the first and second wearable tip-rub-portion distal ends are spaced from each other to define a wearable tip-rub-portion opening that is located radially at the blade tip and in fluid communication with the squealer pocket; and the first and second wearable tip-rub-portions are continuous with each other about the leading and trailing edges of the blade body;
a core passage defined within the blade body;
a first metering tip-portion located radially between the squealer pocket and the core passage, and extending between the pressure side and the suction side, the first metering tip-portion terminating at a first metering tip-portion distal end; and
a second metering tip-portion located radially between the squealer pocket and the core passage, and extending between the suction side and the pressure side, the second metering tip-portion terminating at a second metering tip-portion distal end,
wherein the first and second metering tip-portion distal ends are spaced from each other to define a metering tip-portion opening that is in fluid communication with the squealer pocket, so that the core passage is in fluid communication with the wearable tip-rub-portion opening; and wherein:
the first and second metering tip-portions are continuous with each other about the leading and trailing edges of the blade body, and
the first and second wearable tip-rub-portions and the first and second metering tip-portions have a same shape, so that the tip-rub-portion opening and the metering tip-portion opening have a same shape,
the method comprising:
driving the blade about an engine center axis; and
rubbing, from the driving, the first wearable tip-rub-portion of the blade that is located radially above the squealer pocket against the blade outer air seal to shape the blade outer air seal.

14. The method of claim 13, further comprising
rubbing away, from the driving, the first wearable tip-rub-portion to expose the squealer pocket.

* * * * *